United States Patent Office 2,850,521
Patented Sept. 2, 1958

2,850,521

N-(2,2-DICYANOVINYL)IMIDO COMPOUNDS AND THEIR PREPARATION

Howard F. Mower, Wilmington, Del., assignor to E. I. du Pont de Nemours and Company, Wilmington, Del., a corporation of Delaware No Drawing. Application November 29, 1956
Serial No. 625,001

5 Claims. (Cl. 260—465.5)

This invention is concerned with a novel and useful class of N-substituted imidic acids and their derivatives and with a process for the preparation of the same.

The classical preparation of anils or Schiff's bases involves the reaction of a primary aromatic amine with an aromatic aldehyde. Water is formed as a by-product and a new compound containing a >C=N— structure results. The reaction has been extended to ketones to some extent, but the extension requires higher temperatures and is generally less likely to yield the desired product.

An object of this invention is provision of new and useful compounds containing the >C=N— grouping.

A further object is provision of methods for synthesizing the novel compounds.

The above-identified and yet further objects are achieved in accordance with this invention by the preparation of N-(1-substituted-2,2-dicyanovinyl)imidic acids and some of their derivatives by the reaction of select 1-substituted-2,2-dicyanovinylamines with acyl halides, cyanides or anhydrides. The N-(1-substituted-2,2-dicyanovinyl)imidyl halides, imidyl cyanides or imidic acids are in turn readily converted to other imidic acid derivatives by metathesis with the halide, cyanide or acid function.

The N-(1-substituted-2,2-dicyanovinyl)imidyl halides react readily with aqueous alkali, disubstituted amines, sodium phenylate, sodium alcoholate or sodiomalononitrile to yield, respectively, the corresponding N-(1-substituted-2,2-dicyanovinyl)imidic acid, its amides (i. e., amidines), esters, and dicyanomethyl derivatives.

A general formula for the products of the invention can be written as follows:

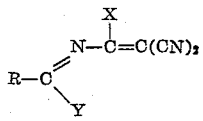

where X may be halogen, aryl, —OR, —NH$_2$, —NHR or —NR$_2$; Y may be halogen, —OR, —NR$_2$, —SR, —OH, —CN, —CH(CN)$_2$, or —OCOR; and R is a hydrocarbon radical, e. g., alkyl, cycloalkyl, alkenyl, aralkyl, and aryl.

The process of the invention is carried out under a wide variety of conditions but perhaps most simply merely by adding one of the reactants to the other, preferably under reflux conditions. Thus, 1-amino-2,2-dicyano-1-methoxyethylene may be added cautiously in small portions to refluxing acetyl chloride to prepare N-(2,2-dicyano-1-methoxyvinyl)acetimidyl chloride. Since there is some risk of a runaway reaction under these simple conditions, the presence of an organic solvent inert to the reactants is preferred. Many organic solvents such as acetone and tetrahydrofuran are usable, preferably in excess over the reagents.

The process may be carried out at room temperature, e. g., around 18°–25° C., but at this temperature the reaction is slow. To bring it to completion in a reasonable time, it is preferred to carry out the reaction at elevated temperatures, preferably in the range of 50–150° C. Temperatures of 200° C. and above may also be used but are generally to be avoided because of loss of reactants or product through decomposition.

Pressure and stoichiometry are not critical in the process. Thus reflux at atmospheric pressure is generally employed although both elevated and reduced pressure can be used. The reactants are generally utilized in approximately stoichiometric, i. e., 1:1, molar ratio to avoid waste of material. A very broad molar range is, however, acceptable, e. g., 20:1–1:20.

The amines operable in the process of this invention are the 1-amino-2,2-dicyanoethylenes in which the remaining 1-position of the ethylene is substituted by halogen, alkoxy, aryloxy, amino, monosubstituted amino, disubstituted amino, or aryl. The operable acyl compounds include acyl chlorides, bromides, cyanides, and anhydrides.

The N-(1-substituted - 2,2 - dicyanovinyl)amines employed as starting materials may be synthesized from malononitrile as follows: Tetracyanoethylene is prepared by the reaction of malononitrile with sulfur monochloride conveniently in the presence of an inert organic diluent and thereafter separating the tetracyanoethylene from the reaction mixture. Tetracyanoethylene is then treated with an alcohol in the presence of a catalyst, such as urea, to obtain a dicyanoketene acetal. When the alcohol is a monohydric alkanol, the corresponding dicyanoketene dialkyl acetal is obtained. When the alcohol is a 1,2- or 1,3-glycol, the corresponding dicyanoketene cyclic acetal is obtained (i. e., 2-dicyanomethylene-1,3-dioxolane or 2-dicyanomethylene-1,3-dioxane).

When a dicyanoketene acetal is treated with an excess of concentrated aqueous ammonia, 1,1-diamino-2,2-dicyanoethylene is obtained. When a dicyanoketene acetal is treated with one equivalent of dilute aqueous ammonia, the corresponding 1-amino-1-alkoxy (or hydroxyalkoxy)-2,2-dicyanoethylene is obtained. Thus, 1-amino-2,2-dicyano-1-methoxyethylene is obtained from dicyanoketene dimethyl acetal; 1-amino-2,2-dicyano-1-ethoxyethylene is obtained from dicyanoketene diethyl acetal; 1-amino-2,2-dicyano-1-β-hydroxyethoxyethylene is obtained from dicyanoketene ethylene acetal (2-dicyanomethylene-1,3-dioxolane); and 1-amino-2,2-dicyano-1-γ-hydroxypropoxyethylene is obtained from dicyanoketene trimethylene acetal (2-dicyanomethylene-1,3-dioxane).

Further, when 1-amino-2,2-dicyano-1-methoxyethylene is treated with a primary or secondary amine, the corresponding 1-amino-2,2-dicyano-1-substituted (or disubstituted) aminoethylene is obtained. Dimethylamine, for example, yields 1-amino-2,2-dicyano-1-dimethylaminoethylene. 1-amino-1-bromo-2,2-dicyanoethylene and 1-amino-1-chloro-2,2-dicyanoethylene are obtained by treating the potassium salt of cyanoform, respectively, with hydrogen bromide or hydrogen chloride.

1-amino-1-aryl-2,2-dicyanoethylenes are prepared in two steps as follows: Benzoyl cyanide or a ring-substituted benzoyl cyanide is treated with malononitrile to yield the corresponding tricyanovinylbenzene derivative. When such a tricyanovinyl aromatic compound is treated with ammonia in pyridine, the 1-cyano group is replaced by an amino group to yield a 1-amino-1-aryl-2,2-dicyanoethylene. Thus, benzoyl cyanide gives tricyanovinylbenzene which reacts with ammonia to give 1-amino-2,2-dicyano-1-phenylethylene.

In a preferred embodiment of the invention 1-amino-2,2-dicyano-1-methoxyethylene and acetyl chloride are dissolved together in acetone and heated under reflux for several hours. The acetone is then removed by evaporation and, as the solution becomes more concentrated, a precipitate of N-(2,2-dicyano-1-methoxyvinyl)acetimidyl chloride separates and is purified by recrystallization from ethyl acetate.

In the following non-limiting examples parts are by weight and pressures are ambient atmospheric unless otherwise specified.

EXAMPLE I

*N-(2,2-dicyano-1-ethoxyvinyl)-acetimidyl chloride*

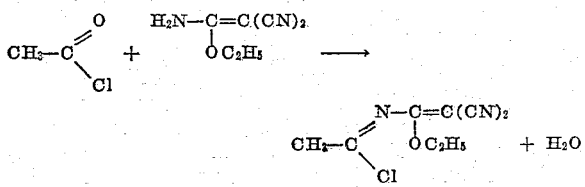

1-amino-2,2-dicyano-1-ethoxyethylene (30 parts) is dissolved in 1580 parts of boiling acetone. Acetyl chloride (1105 parts) is added and the solution is heated under reflux for two hours. The mixture is then evaporated at room temperature under a stream of air to about one fifth its original volume. A crystalline precipitate is formed which is separated by filtration and dried to yield 13 parts of N-(2,2-dicyano-1-ethoxyvinyl)acetimidyl chloride (25% yield). A sample is recrystallized from petroleum ether to give colorless crystals, melting at 69–70° C.

*Analysis.*—Calcd. for $C_8H_8N_3OCl$: C, 48.6; H, 4.05; N, 21.25; Cl, 17.48. Found: C, 49.18; H, 4.31; N, 20.95; Cl, 18.04.

EXAMPLE II

*N-(2,2-dicyano-1-methoxyvinyl)propionimidyl chloride*

1-amino-2,2-dicyano-1-methoxyethylene (30 parts) is dissolved in 1580 parts of acetone. The solution is heated to reflux and 213 parts of propionyl chloride is added. Refluxing is continued for 2 hours. The solution is then cooled and the acetone is evaporated in a stream of air at room temperature. The resulting thick red oil is triturated with water until it crystallizes. The crystalline mass is extracted with ethyl acetate and the resulting ethyl acetate solution is evaporated to dryness to give a 50% yield of N-(2,2-dicyano-1-methoxyvinyl)-propionimidyl chloride. This is recrystallized from petroleum ether to give colorless crystals melting at 44–45° C. This product is not soluble in water, 5% KOH or 5% HCl. It is stable in boiling aqueous methanol.

*Analysis.*—Calcd. for $C_8H_8N_3OCl$: C, 48.6; H, 4.05; N, 21.25; Cl, 17.95. Found: C, 48.74; H, 4.18; N, 21.40; Cl, 17.48.

EXAMPLE III

*N-(2,2-dicyano-1-methoxyvinyl)acetimidyl chloride*

1-amino-2,2-dicyano-1-methoxyethylene (30 parts) is dissolved in 1580 parts of boiling acetone and 1105 parts of acetyl chloride is added. The solution is kept at reflux temperature for 2½ hours. Acetone is then evaporated under a stream of air at room temperature to yield 10.2 parts (22% yield) of crystalline N-(2,2-dicyano-1-methoxyvinyl)acetimidyl chloride. Recrystallization from petroleum ether gives colorless crystals melting at 88° C.

*Analysis.*—Calcd. for $C_7H_6N_3OCl$: C, 45.8; H, 3.27; N, 22.9. Found: C, 46.05; H, 3.35; N, 23.41.

EXAMPLE IV

*Methyl ester of N-(2,2-dicyano-1-methoxyvinyl) acetimidic acid*

N-(2,2-dicyano-1-methoxyvinyl)acetimidyl chloride (70 parts) is added to a solution of 110 parts of potassium carbonate in a mixture of 912 parts of methanol and 800 parts of water. The mixture is heated to boiling for one-half hour. The solution is then reduced by evaporation to about one third its original volume. When the resulting solution is cooled, a white crystalline precipitate forms which is collected by filtration and dried. The filtrate is used as shown in Example V. The precipitate comprises 16 parts (25% yield) of the methyl ester of N-(2,2-dicyano-1-methoxyvinyl)acetimidic acid, melting at 132° C. This product is recrystallized from aqueous methanol and analyzed as follows:

*Analysis.*—Calcd. for $C_8H_9N_3O_2$: C, 53.85; H, 5.10; N, 22.98. Found: C, 53.65; H, 5.03; N, 23.45.

EXAMPLE V

*N-(2,2-dicyano-1-methoxyvinyl)acetimidic acid*

The filtrate from Example IV is rendered acid by the addition of aqueous hydrochloric acid. A crystalline precipitate forms which is cooled by filtration and dried to give 17 parts (30% yield) of N-(2,2-dicyano-1-methoxyvinyl)-acetimidic acid, melting at 239–241° C.

*Analysis.*—Calcd. for $C_7H_7N_3O_2$: C, 50.9; H, 4.25; N, 24.45. Found: C, 51.20; H, 4.22; N, 24.95.

EXAMPLE VI

*N-(1-amino-2,2-dicyanovinyl)acetimidyl chloride*

1,1-diamino-2,2-dicyanoethylene (250 parts) is dissolved in 2620 parts of glacial acetic acid. Acetyl chloride (1380 parts) is added and the reaction mixture is heated at 56° C. for four hours. A light brown solid is precipitated during this period. This is collected by filtration and dried to obtain 366 parts of N-(1-amino-2,2-dicyanovinyl)acetimidyl chloride, melting above 300° C. It is insoluble in water and acetone, and soluble in dimethylformamide.

A sample of N-(1-amino-2,2-dicyanovinyl)acetimidyl chloride is disssolved in 10% potassium hydroxide, boiled with decolorizing carbon and filtered. Acidification of the filtrate yields a precipitate of colorless crystals of N-(1-amino - 2,2 - dicarbamoylvinyl)acetimidyl chloride, melting above 300° C.

*Analysis.*—Calcd. for $C_6H_9N_4O_2Cl$: C, 35.3; H, 4.42; N, 27.4; Cl. 17.4. Found: C, 35.67; H, 5.36; N, 27.61; Cl, 17.32.

EXAMPLE VII

*Ethyl ester of N-(2,2-dicyano-1-methoxyvinyl)propionimidic acid*

N-(2,2-dicyano-1-methoxyvinyl)propionimidyl chloride (50 parts) is added to 1580 parts of ethyl alcohol in which 24 parts of sodium has previously been dissolved. The mixture is stirred at room temperature. A red color develops and a white precipitate of sodium chloride forms. The precipitate is removed by filtration and the solution is evaporated to about one half its original volume. The solution is cooled and about 500 parts of water is added. There is obtained a crystalline precipitate of the ethyl ester of N - (2,2 - dicyano - 1 -methoxyvinyl)propionimidic acid, which melts at 22–24° C.

EXAMPLE VIII

*Butyl ester of N-(2,2-dicyano-1-methoxyvinyl)acetimidic acid*

N - (2,2 - dicyano - 1 - methoxyvinyl)acetimidyl chloride (500 parts) is dissolved in 3600 parts of ethyl acetate. This solution is added with vigorous agitation to a cold (—5° C.) solution of 69 parts of sodium dissolved in 810 parts of dry n-butanol. The mixture is stirred for one hour and 495 parts of a solid crystalline precipitate separates. This solid is extracted with ethyl acetate and filtered. The filtrate is evaporated to yield a solid residue which is recrystallized from petroleum ether to give 344 parts (60% yield) of the butyl ester of N-(2,2-dicyano-1-methoxyvinyl)acetimidic acid, melting at 109–110° C.

*Analysis.*—Calcd. for $C_{11}H_{15}N_3O_2$: C, 60.0; H, 6.8; N, 19.0; M. W., 221. Found: C, 59.7; H, 6.29; N, 19.5; M. W., 218.

EXAMPLE IX

*Phenyl ester of N-(2,2-dicyano-1-methoxyvinyl)-acetimidic acid*

Sodium (69 parts) is dissolved in 1780 parts of tetrahydrofuran containing 282 parts of phenol. N-(2,2-dicyano-1-methoxyvinyl)acetimidyl chloride (500 parts) is added and the reaction mixture is stirred for one-half hour. The solution is then heated to boiling and evaporated to one half its original volume. Anhydrous ethyl ether (1800 parts) is added and the mixture is cooled and filtered. The filtrate is evaporated to dryness to obtain a crystalline solid. This material is recrystallized from absolute ethyl ether to give 490 parts (75% yield) of the phenyl ester of N-(2,2-dicyano-1-methoxyvinyl)-acetimidic acid, M. P.=133° C.

*Analysis.*—Calcd. for $C_{13}H_{11}N_3O_2$: C, 64.70; H, 4.56; N, 17.41. Found: C, 65.07; H, 4.76; N, 17.39.

EXAMPLE X

*N'-(2,2-dicyano-1-methoxyvinyl)-N,N-diethylacetamidine*

N-(2,2-dicyano-1-methoxyvinyl)acetimidyl chloride (50 parts) is added with vigorous agitation to 285 parts of diethylamine. A vigorous exothermic reaction occurs, and a white crystalline precipitate of diethylamine hydrochloride forms. The reaction mixture is filtered and the filtrate is evaporated to obtain 51 parts (85% yield) of N'-(2,2-dicyano-1-methoxyvinyl)-N,N-diethylacetamidine, melting at 40–41° C. A sample of this material is recrystallized from petroleum ether and analyzed as follows:

*Analysis.*—Calcd. for $C_{11}H_{16}N_4O$: C, 60.0; H, 7.27; N, 25.42; M. W., 220. Found: C, 60.30; H, 7.17; N, 25.51; M. W., 222, 226.

EXAMPLE XI

*N-(2,2-dicyano-1-methoxyvinyl)acetimidic acid*

1-amino-2,2-dicyano-1-methoxyethylene (20 parts) is dissolved in 163 parts of acetic anhydride. The mixture is heated to boiling and 0.5 part of concentrated sulfuric acid is added. The mixture is refluxed for 10 minutes, then cooled and evaporated to dryness in a stream of air. The crystalline residue is recrystallized from water to give 8 parts (46% yield) of N-(2,2-dicyano-1-methoxyvinyl) acetimidic acid, melting at 243–244° C.

*Analysis.*—Calcd. for $C_7H_7N_3O_2$: C, 50.9; H, 4.25; N, 25.45; M. W., 165. Found: C, 51.34; H, 4.65; N, 25.02; M. W., 161.

EXAMPLE XII

*N-(p-chlorophenyl)-N'-(2,2-dicyano-1-methoxyvinyl)acetamidine*

A solution of 100 parts of N-(2,2-dicyano-1-methoxyvinyl)acetimidyl chloride in 355 parts of tetrahydrofuran is mixed with a solution of 147 parts of p-chloroaniline in 266 parts of tetrahydrofuran and the mixture is stirred at room temperature for 32 hours. During this time 92.5 parts of p-chloroaniline hydrochloride separates as a crystalline precipitate and is removed by filtration. The filtrate is evaporated to obtain 83 parts (60% yield) of N-(p-chlorophenyl)-N'-(2,2-dicyano-1-methoxyvinyl) acetamidine. This is recrystallized from tetrahydrofuran to obtain colorless crystals melting at 234° C.

EXAMPLE XIII

*N'-(2,2-dicyano-1-methoxyvinyl)-N,N-dimethylacetamidine*

A solution of 917 parts of N-(2,2-dicyano-1-methoxyvinyl)acetimidyl chloride in 3550 parts of tetrahydrofuran is added slowly to a solution of 1000 parts of dimethylamine in 1780 parts of tetrahydrofuran at 0° C. The mixture is stirred and let stand at room temperature for 16 hours. A cream-colored precipitate of dimethylamine hydrochloride forms and is removed by filtration. The filtrate is evaporated to obtain 900 parts (90% yield) of N'-(2,2-dicyano-1-methoxyvinyl)N,N-dimethylacetamidine. A sample recrystallized from acetone gives colorless crystals which melt at 135–137° C.

EXAMPLE XIV

*2,4-dichlorophenyl ester of N-(2,2-dicyano-1-methoxyvinyl)acetimidic acid*

2,4-dichlorophenol (917 parts) is dissolved in 2660 parts of tetrahydrofuran and 115 parts of metallic sodium is added. The mixture is stirred for about 7 hours until the sodium is dissolved. A solution of 815 parts of N-(2,2-dicyano-1-methoxyvinyl)acetimidyl chloride in 1770 parts of tetrahydrofuran is added and the mixture is stirred at room temperature for 16 hours. A precipitate of 265 parts of sodium chloride forms and is removed by filtration. The filtrate is evaporated to obtain 1410 parts (90% yield) of the 2,4-dichlorophenyl ester of N-(2,2-dicyano-1-methoxyvinyl)acetimidic acid. A sample recrystallized from ethanol gives colorless crystals which melt at 94–95° C.

*Analysis.*—Calcd. for $C_{13}H_9N_3O_2Cl_2$: C, 50.32; H, 2.90; Cl, 22.90; N, 13.55; M. W., 310. Found: C, 49.38; H, 2.96; Cl, 22.68; N, 13.40; M. W. 315, 318.

Other acyl compounds which may be treated with 1-amino-1-substituted-2,2-dicyanoethylenes to yield the indicated N-(2,2-dicyanovinyl)imidyl compounds are shown in the following table:

TABLE

| Acyl compound | 1-amino-2,2-dicyanoethylene | N-(2,2-dicyanovinyl)-imidyl compound |
|---|---|---|
| Benzoyl bromide | 1-amino-2,2-dicyano-1-phenylethylene. | N-(2,2-dicyano-1-phenylvinyl) benzimidyl bromide. |
| Phenylpropioloyl chloride. | 1-amino-2,2-dicyano-1-dimethylaminoethylene. | N-(2,2-dicyano-1-dimethyl-aminovinyl) phenylpropiolimidyl chloride. |
| Methacryloyl chloride. | 1-amino-2,2-dicyano-1-n-butylaminoethylene. | N-(1-n-butylamino-2,2-dicyanovinyl)methacrylimidyl chloride. |
| α-Naphthoyl bromide. | 1,1-diamino-2,2-dicyanoethylene. | N-(1-amino-2,2-dicyanovinyl)-α-naphthoimidyl bromide. |
| Stearoyl chloride | 1-amino-2,2-dicyano-1-(γ-hydroxypropoxy) ethylene. | N-(2,2-dicyano-1-γ[-hydroxypropoxy] vinyl)-stearimidyl chloride. |
| Acetyl cyanide. | 1-amino-2,2-dicyano-1-methoxyethylene. | N-(2,2-dicyano-1-methoxyvinyl)-acetimidyl cyanide. |
| Acetic anhydride. | 1-amino-1-bromo-2,2-dicyanoethylene. | N-(1-bromo-2,2-dicyanovinyl)acetimidic acid. |
| Phenylacetyl chloride. | 1-amino-1-chloro-2,2-dicyanoethylene. | N-(1-chloro-2,2-dicyanovinyl) phenylacetimidyl chloride. |
| Hexahydrobenzoyl chloride. | 1-amino-2,2-dicyano-1-methoxyethylene. | N-(2,2-dicyano-1-methoxyvinyl) hexahydrobenzimidyl chloride. |

The N-(1-substituted-2,2-dicyanovinyl)imidyl compounds of this invention can also be prepared from one another by suitable metathesis reactions. For such preparations it is convenient to treat one of the imidyl halides with an alkali metal compound, forming the desired imidyl derivative with alkali metal halide as by-product.

For example N-(2,2-dicyano-1-methoxyvinyl)-acetimidyl chloride reacts with a molar equivalent of the sodium derivative of ethyl mercaptan to yield the ethyl ester of N-(2,2-dicyano-1-methoxyvinyl)thiolacetimidic acid. In a similar way N-(2,2-dicyano-1-phenylvinyl)-benzimidyl bromide reacts with sodiomalononitrile to replace the bromide group with the dicyanomethyl group.

Mixed anhydrides of the imidic acids of this invention are also prepared in this way. Thus N-(2,2-dicyano-1-ethoxyvinyl)acetimidyl chloride reacts with sodium acetate to yield the mixed anhydride of N-(2,2-dicyano-1-ethoxyvinyl)acetimidic acid with acetic acid.

The N-(1-substituted-2,2-dicyanovinyl)imidic acids and their imidyl derivatives obtained according to this invention are useful as stabilizers in preventing charring of polyvinyl chloride when it is strongly overheated as in electrical insulation where lines are subject to overloading. This utility is shown in Example A.

EXAMPLE A

Separate portions of a high molecular weight unmodified polyvinyl chloride powder are ground with 1% by weight of the following compounds, respectively:

(1) N - (2,2 - dicyano-1-methoxyvinyl)acetimidyl chloride;
(2) N-(2,2-dicyano-1-methoxyvinyl)acetimidic acid;
(3) Phenyl ester of N-(2,2-dicyano-1-methoxyvinyl)-acetimidic acid; and
(4) N - (p - chlorophenyl) - N' - (2,2 - dicyano-1-methoxyvinyl)acetamidine.

Small samples of the ground compositions are separately pressed between aluminum foils in a platen press at 17,000 lb./in.$^2$, first for 5 minutes at 135° C., followed by 11 minutes at 220° C. A control sample of the unmodified polyvinyl chloride is similarly heated. The heat and pressure form the compositions into films about 0.007 inch thick. The center of the control film is charred and completely burned away from the brown periphery which remains. The four films containing the stabilizers noted above are brown but homogeneous and show no areas of complete charring.

It will be understood that various modifications of the invention will be apparent to those skilled in the chemical arts. I propose, consequently, to be bound solely by the appended claims.

The embodiments of the invention in which an exclusive property or privilege is claimed are defined as follows:

1. A compound having the formula

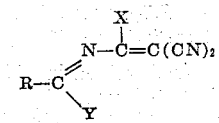

where: X is selected from the group consisting of chlorine, bromine, aryl, —OR', —NH$_2$, —NHR' and —NR'$_2$, R' being a lower alkyl radical; Y is selected from the group consisting of chlorine, bromine, —OR", —NR"$_2$, —SR", —OH, —CN, —CH(CN)$_2$, and —OCOR", R" being a member of the group consisting of lower alkyl and aryl; and R is selected from the group consisting of alkyl, cycloalkyl, alkenyl, aralkyl and aryl hydrocarbon.

2. A N - (2,2 - dicyano - 1 - methoxyvinyl)acetimidyl halide, the halogen being a member of the group consisting of chlorine and bromine.

3. N-(2,2-dicyano-1-methoxyvinyl)acetimidic acid.

4. The method of preparing the compound of claim 1 which comprises reacting a 1-amino-2,2-dicyanoethylene in which the remaining 1-position is substituted by a member of the group selected from chlorine, bromine, alkoxy, aryloxy, amino, monosubstituted amino, disubstituted amino and aryl radicals with an acyl compound selected from the group consisting of acyl chlorides, bromides, cyanides and anhydrides.

5. The method of claim 4 carried out in the presence of an inert organic solvent.

References Cited in the file of this patent
UNITED STATES PATENTS 2,762,832     Heckert _____ Sept. 11, 1956
2,773,892     Little, Jr. _____ Dec. 11, 1956